US009806501B1

United States Patent
Sommerer

(10) Patent No.: US 9,806,501 B1
(45) Date of Patent: Oct. 31, 2017

(54) SPARK GAP WITH TRIPLE-POINT ELECTRON EMISSION PROMPTING

(71) Applicant: General Electric Company, Schenectady, NY (US)

(72) Inventor: Timothy John Sommerer, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/239,503

(22) Filed: Aug. 17, 2016

(51) Int. Cl.
*H01T 1/00* (2006.01)
*H01T 15/00* (2006.01)
*F02C 7/266* (2006.01)

(52) U.S. Cl.
CPC .............. *H01T 15/00* (2013.01); *F02C 7/266* (2013.01); *H01T 1/00* (2013.01); *F05D 2220/323* (2013.01)

(58) Field of Classification Search
CPC ... H01T 1/00; H01T 15/00; H05H 1/24; H01J 37/32055; H01J 15/00; F02C 7/26; F02C 7/264; F02C 7/266; F02C 7/27
USPC ..................................... 315/111.21
See application file for complete search history.

(56) References Cited

U.S. PATENT DOCUMENTS

| | | | | |
|---|---|---|---|---|
| 3,811,070 A | * | 5/1974 | Voshall | H01J 17/14 313/552 |
| 4,396,855 A | * | 8/1983 | Imai | F02P 9/007 313/139 |
| 4,402,036 A | * | 8/1983 | Hensley | F02P 7/03 313/138 |
| 4,771,168 A | * | 9/1988 | Gundersen | H01T 2/00 250/214.1 |
| 4,841,925 A | * | 6/1989 | Ward | F02P 3/0884 123/143 B |
| 5,153,460 A | | 10/1992 | Bovino et al. | |
| 6,060,791 A | | 5/2000 | Goerz et al. | |
| RE41,362 E | * | 6/2010 | Koshelev | B82Y 10/00 250/491.1 |
| 8,230,672 B2 | | 7/2012 | Mungas et al. | |
| 9,341,610 B1 | * | 5/2016 | McIver | G01N 33/22 |
| 2002/0193033 A1 | * | 12/2002 | Nasu | A61F 13/49453 442/401 |

(Continued)

FOREIGN PATENT DOCUMENTS

| | | |
|---|---|---|
| CN | 202957450 U | 5/2013 |
| WO | 3519651 A1 | 7/1995 |

OTHER PUBLICATIONS

McPhee, A.J., et al.; "Electromagnetic modelling design considerations for triggered spark gaps", Pulsed Power '97 (Digest No. 1997/075), IEE Colloquium on, pp. 35/1-35/4, Mar. 19, 1997, London.

(Continued)

*Primary Examiner* — Jason M Crawford
(74) *Attorney, Agent, or Firm* — Nitin N. Joshi

(57) ABSTRACT

The present approach relates to generating seed electrons at a spark gap in the absence of $^{85}$Kr. The present approach utilizes electron emission from a triple-point instead to provide seed electrons to reduce the statistical time lag of a spark gap. In one such implementation, a spark gap a spark gap may be fabricated and/or operated without a radioactive component without otherwise changing its overall form or function of the spark gap.

17 Claims, 4 Drawing Sheets

(56) References Cited

U.S. PATENT DOCUMENTS

| | | | |
|---|---|---|---|
| 2003/0121887 A1* | 7/2003 | Garvey | B82Y 30/00 216/65 |
| 2005/0034668 A1* | 2/2005 | Garvey | B82Y 30/00 118/723 R |
| 2006/0152128 A1* | 7/2006 | Manning | H01J 61/025 313/113 |
| 2008/0098973 A1 | 5/2008 | Niwa et al. | |
| 2013/0025255 A1 | 1/2013 | Zizzo | |

OTHER PUBLICATIONS

Schachter, Levi; "Analytic expression for triple-point electron emission from an ideal edge", Applied Physics Letters, vol. 72, Issue: 4, pp. 421, 1998.

Jordan, Nicholas M., et al.; "Electron Emission near a Triple Point", 2008 IEEE International Power Modulators and High-Voltage Conference, pp. 311, May 27-31, 2008, Las Vegas, NE.

* cited by examiner

SPARK GAP WITH TRIPLE-POINT ELECTRON EMISSION PROMPTING

BACKGROUND

The subject matter disclosed herein relates to spark gaps for use in ignition systems or other suitable systems.

Spark gaps are passive, two-terminal switches that are open when the voltage across the terminals is low, and then close when the voltage across the terminals exceeds a design value (e.g., 3 kV). The spark gap then re-opens when the current has fallen to a low level or when most of the energy from the voltage source is dissipated. Internally the current is carried between two metal electrodes that are separated by a small 'gap' (~mm) that is filled with a gas or gas mixture (e.g., Ar—$H_2$—Kr) near atmospheric pressure. The gas is ordinarily insulating, but it becomes a conducting plasma 'spark' when the voltage between the two electrodes exceeds the design value which corresponds to the breakdown voltage.

For various applications, one parameter of interest may be the time between when a sufficient voltage is applied to the spark gap and the time at which it becomes conducting. This time corresponds to the 'breakdown' processes that initiate the transition of the gas from an insulator to a conductor.

There is an idealized but useful view of electrical breakdown as a two-step process—a 'statistical' time for the first electron to appear, followed by 'formative' time for the electrons to 'avalanche' to a highly conductive state. A free electron appears at some time and location in the gap, and is accelerated by the electric field that is created by the potential difference between the electrodes. Once the electron gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and first free electron should be created in preferred locations (e.g., at or near the negative electrode) for maximum effectiveness.

The time required for the second (avalanching) process is the 'formative time lag'. It is generally short and can be practically ignored. Thus, the time required for the first process (the initial electron) is the 'statistical time lag', and it is this 'first electron problem' that is of primary interest in practice. In some devices such as laboratory apparatus or large electric discharge lamps the 'first electron problem' is solved by doing nothing more than waiting for a cosmic ray to create a free electron when it collides with a gas atom, gas molecule, or surface within the device. Electron-ion pairs are always being created at a given rate in atmospheric air by energetic cosmic rays that can easily penetrate into gas volumes within devices and structures.

However, the ubiquitous cosmic-ray process cannot be relied upon to create effective free electrons within a required timeframe that may be needed for reliable operation of many devices that incorporate a spark gap. In particular, for device employing a spark gap the timeframe is typically too short to rely on a cosmic ray based process because the interaction volume (the gas region between the electrodes) is relatively small.

Instead, the conventional approach to solving the first-electron problem in a spark gap context (as well as in other devices dealing with similar issues, such as small electric discharge lamps) is to add a source of radioactivity, for example in the form of radioactive krypton-85, which undergoes beta decay to emit an energetic (687 keV) electron, to generate seed electrons and reduce statistical time-lag to acceptable values. Other radioactive materials such as tritium or thorium are sometimes used. The addition of a radioactive component is sometimes referred to as 'radioactive prompting'.

However, radioactive materials, even at trace level, are generally not desirable in a component or product because these materials add to of the cost of manufacturing, handling, and shipping.

BRIEF DESCRIPTION

In one embodiment, a spark gap device is provided. In accordance with this embodiment, the spark gap includes a first electrode having a first surface and a second electrode having a second surface offset from and facing the first surface. The second surface comprises a conductive inner region and a substantially insulating peripheral region.

In a further embodiment, an ignition device is provided. In accordance with this embodiment, the ignition device includes one or more igniters configured to ignite a fuel stream or vapor during operation and one or more exciter components, each connected to a respective igniter. Each exciter component includes a spark gap having a triple emission point that generates free electrons when the spark gap is operated.

In an additional embodiment, a method for generating a conductive plasma is provided. In accordance with this method, a voltage is applied across a spark gap including a first electrode and a second electrode. The first electrode includes a surface facing the second electrode that has a conductive inner region and a substantially insulating peripheral region. Free electrons are generated at one or more boundaries between the conductive inner region and the substantially insulating peripheral region via a triple point emission effect. Subsequent to generating the free electrons, the conductive plasma is generated across the spark gap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present approach relates to spark gaps, such as those used in ignition systems for combustion engines, as well as in other contexts such as surge protection, power switching, and so forth. As discussed herein, spark gaps (which as used herein refers to the assembly of electrodes, envelope (e.g., glass envelope), and contained gas) are disclosed in which krypton-85, a radioactive component, is not present, but in which the spark gap otherwise maintains its functionality.

In particular, while krypton-85 ($^{85}$Kr) is typically used to generate seed electrons and to facilitate spark formation, in accordance with the present approach $^{85}$Kr is eliminated from the spark gap and the electron emission from a triple-point is instead used to provide seed electrons to reduce the statistical time lag of a spark gap. This approach to producing seed electrons functionally replaces the undesirable use of radioactive materials like $^{85}$Kr in spark gaps.

Figure 1:
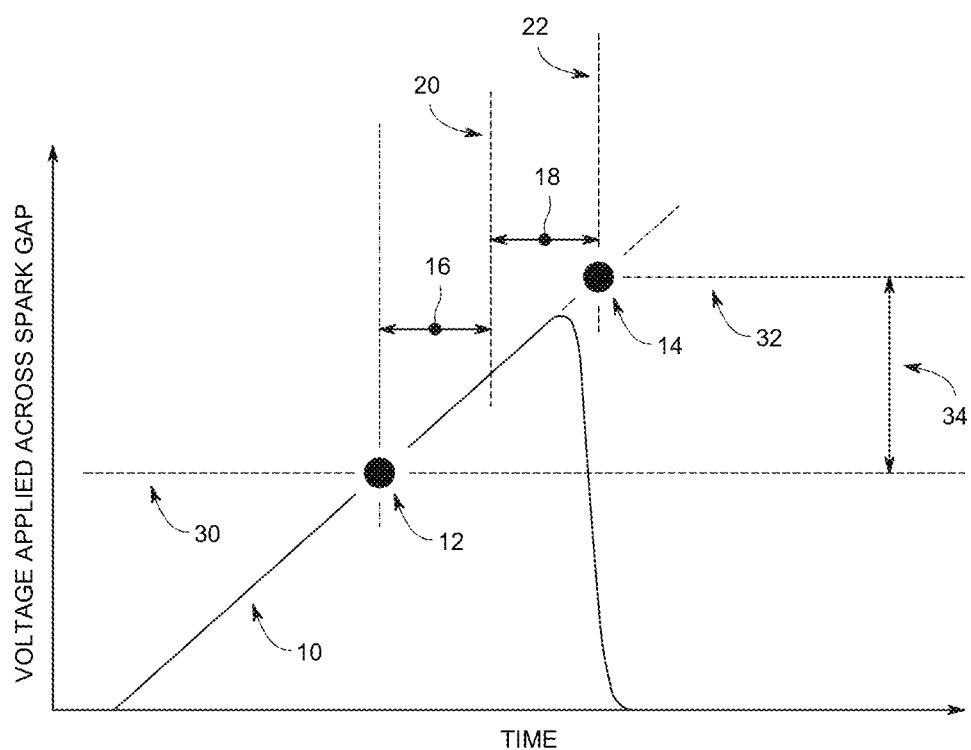
FIG. 1 depicts voltage with respect to time in spark gap operation so as to illustrate concepts related to the present approach.

With the preceding in mind, and by way of introduction to the concepts and terminology used herein, the present focus is on the time between the application of a sufficient voltage to a spark gap and the time at which the spark gap becomes conducting. An illustrative example of this process is illustrated in FIG. 1. In this example, if the voltage waveform 10 is a ramp, the rate of voltage rise is 6 kV/s, and the desired voltage rating is 3±0.05 kV, then the total time from Point 12 (the time sufficient voltage for the spark gap to fire is reached) to Point 14 (the time when the spark gap is closed) should be no more than 33 ms. This time corresponds to the 'breakdown' processes that initiate the transition of the gas from an insulator to a conductor.

As noted above, an idealized but useful view of electrical breakdown is to view it as a two-step process, with a first component corresponding to a 'statistical' time 16 for the first electron to appear (at time 20), followed by a second component corresponding to a 'formative' time 18 for the electrons to 'avalanche' to a highly conductive state, occurring at time 22 when the spark gap closes. In this example, the difference between the voltage 30 sufficient for the spark gap to fire and the voltage 32 at which the spark gap closes is the variation 34 in gap voltage.

In terms of the underlying concept, a free electron appears at some time and location in the gas surrounding the spark gap, and is accelerated by the electric field that is created by the potential difference between the electrodes. Once it gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and first electrons are preferably created in certain locations (e.g., near the negative electrode or cathode) for maximum effectiveness.

As noted above, the time 16 required for the first process (i.e., the release of the initial electron) is referred to as the 'statistical time lag', and it is this 'first electron problem' that is addressed in the present approach. The present approach solves the first-electron problem in the spark gap (i.e., the statistical time lag) without relying on the traditional approach of providing a source of ionizing radiation (e.g., $^{85}$Kr), which is generally undesirable, and thus does not employ 'radioactive prompting'. Similarly, the present approach does not rely solely on the effects of cosmic-rays for generation of the initial electrons as such rays typically are insufficient to generate first electrons at a sufficient rate needed in a spark gap ignition context (or other industrial or mechanical context).

With the preceding introduction in mind, the present approach employs a "triple point emission" as a mechanism for electron field emission. Triple-point emission occurs when electrons are emitted by field emission from surface locations where a conductor (e.g., a metal), insulator (e.g., a ceramic or oxide layer), and a gas or vacuum come into contact at a point or boundary (i.e., at the intersection of these three mediums, hence the triple point) and the local electric field can be very high. The difference in surface potential between the adjacent conducting and insulating regions leads to the formation of very high electric fields at the boundary between the two regions. The electric fields then pull electrons from the conducting material by electric field emission. The effect can be realized in practice in a spark gap through use of a composite electrode, where some portion of the metal surface is in contact with an insulating material (e.g., an insulating patch, layer, or insert).

Of note, the present approach does not interfere with the ordinary operation of the spark gap, limiting the impact on other aspects of the device or system employing a spark gap as discussed herein. For example, it has been experimentally observed in prior-art spark gaps that the conducting arc tends to be located near the centerline of the electrodes. The present approaches do not alter or modify areas of the electrode surface, e.g., the cathode surface, near the centerline. Instead, the contemplated modification (i.e., addition of an insulator region proximate or adjacent to the conductor) to the electrode surface is made to areas of the cathode away from the centerline (i.e., the periphery or outer edge), thereby avoiding interference with the conducting spark at the centerline and to avoiding damage to the modification by the high current of the conducting spark.

Figure 2:
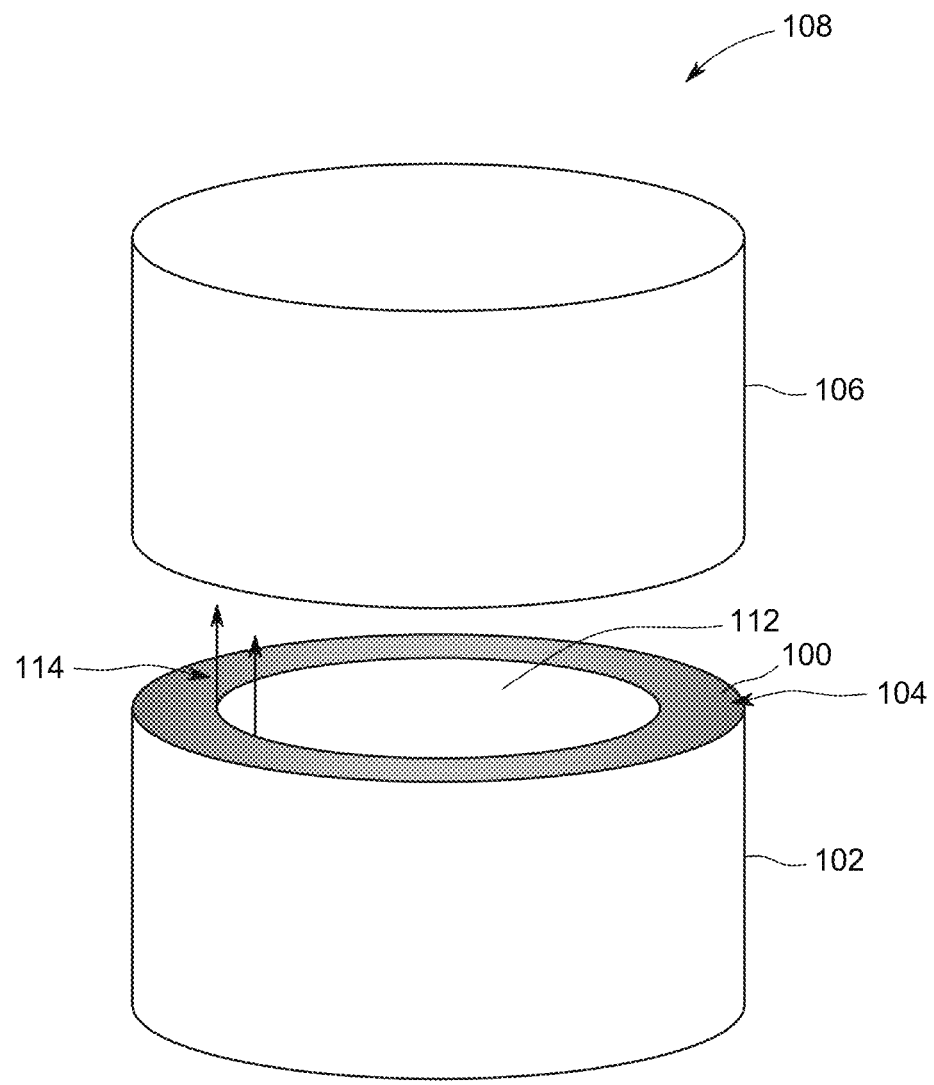
FIG. 2 depicts a first implementation of an electrode for use in a spark gap, in accordance with aspects of the present disclosure.
Figure 3:
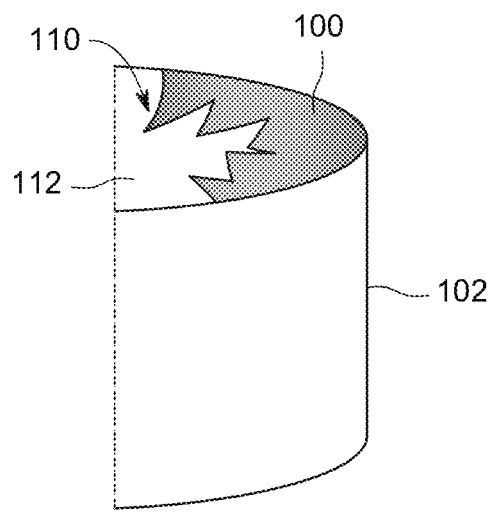
FIG. 3 depicts a second implementation of an electrode for use in a spark gap, in accordance with aspects of the present disclosure.
Figure 4:
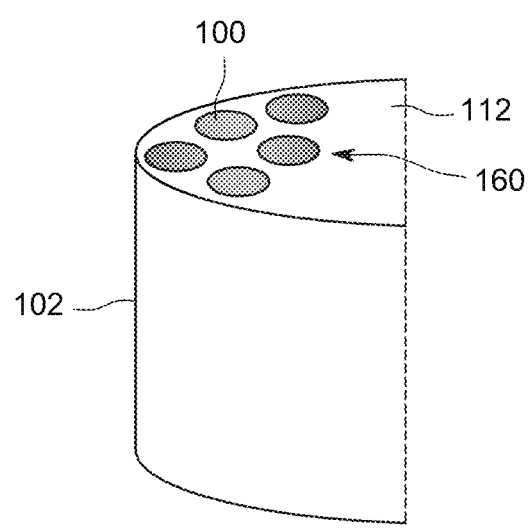
FIG. 4 depicts a third implementation of an electrode for use in a spark gap, in accordance with aspects of the present disclosure.

With the preceding in mind, three arrangements of insulating regions for use in a spark gap 108 are shown in FIGS. 2-4. In FIG. 2, the insulating region 100 is a ring 104 around the edge of the cathode 102, away from the centerline (to avoid the sparking region). Thus the ring 104 surrounds a metal, conductive region 112 of the cathode 102.

In one implementation, the percentage of the total surface area facing the opposing electrode that is insulating (e.g., the ring 104 in the depicted example) is between 10% to 20%, though this percentage may vary depending on the application and/or composition of the insulator material. In various implementations, the insulating region 100 may be formed on the surface of the electrode (e.g., cathode 102 in this example) as a deposited or patterned layer of insulating material in the specified geometry or may be formed as a separate and distinct component, such as an annular ring or "washer", fitted or attached to a complementary region of the electrode so as to form a generally flush surface.

In one embodiment, the insulating region 100 may be formed using an insulating material, such as aluminum oxide (i.e., alumina) or other suitable insulating materials, such as polytetrafluoroethylene (PTFE, also known by the trade name Teflon®), disposed on one of the electrodes, such as cathode 102. The insulating material should be suitable for use in sealed vacuum and gas devices, in that it should not outgas at the operating temperature. As noted above, free electrons 114 are generated near the boundary of the insulator 100 and conductive metal 112 and, in operation, are accelerated across the spark gap 108 so as to be able to seed gas breakdown.

In FIG. 3, a portion of a suitable cathode 102 is depicted having an alternative geometry. In this example, the insulator is provided as a ring 110 with a jagged (i.e., irregular, uneven or non-smooth) edge. One effect of the irregular or (e.g., jagged) edge is to increase the length of the boundary between the conducting regions 112 and insulating regions 100, which is the area where triple-point emission can occur.

In FIG. 4, a further alternative geometry of the insulating region is depicted. In this example, a portion of a suitable cathode 102 is depicted having an insulating region 100 provided as a series of separate and discrete sub-regions 160 (i.e., a discontinuous pattern, such as spots or patches). As in the preceding example, such an implementation again serves to increase the length of the boundary where triple-point emission can occur.

In one embodiment, free electrons 114 are created near the cathode (negative electrode) surface for maximum effectiveness. Electrons 114 that are created near the cathode surface are accelerated by the electric field toward the anode 106, and have the chance to collide and avalanche. If free electrons are near the anode surface, then they will be immediately returned to the anode 106 by the same electric fields. If the spark gap 108 is operated only in one polarity then the surface modifications should be made to the cathodic electrode 102. If the spark gap 108 is operated on an alternating current waveform then the modifications can be made to either electrode surface, or to both electrode surfaces, depending on the frequency of the alternating current and the maximum acceptable statistical delay time.

Figure 5:
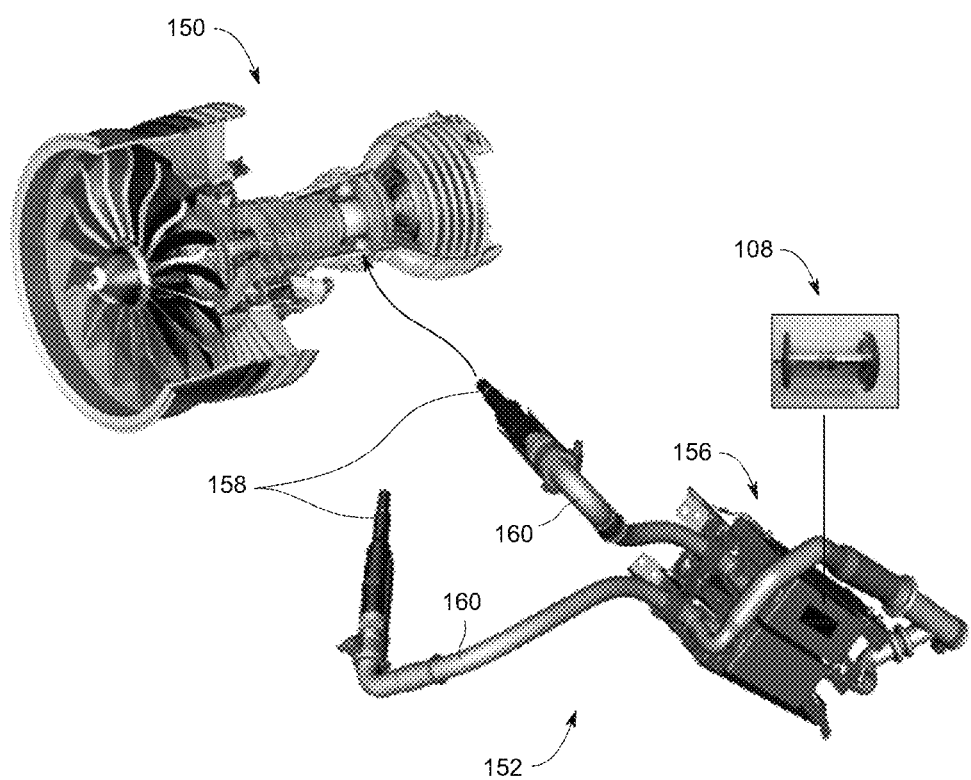
FIG. 5 depicts an engine, here a jet engine, employing ignition components that include a spark gap as discussed herein and in accordance with aspects of the present disclosure.

With the preceding in mind, FIG. 5 depicts an example of an engine 150, here a jet engine, in which the spark gap 108 may be employed as part of the fuel ignition system 152 for the engine 150 by which a fuel stream or vapor is combusted. In this example, a spark gap 108 may be provided for one or more igniters 158. For example, each spark gap 108 may be provided as part of an exciter component 156 in communication with a respective igniter 158 via a corresponding lead 160. In this manner, spark events induced at a given spark gap 108 may correspond to a conductive flow between the electrodes of the spark gap 108, causing an ignition event at the corresponding igniter 158 and an ignition event during operation of the engine 150. Though an engine 150 such as that depicted in FIG. 5 is one possible use for a spark gap 108 as discussed herein (e.g., as part of an ignition system), a spark gap 108 as presently disclosed may also be used in other ignition and non-ignition contexts.

Technical effects of the invention include the fabrication and operation of a spark gap without a radioactive component without otherwise changing its overall form or function of the spark gap. The changes are confined to the volume of the spark, and no changes are required to the remainder of the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A spark gap, comprising:
a first electrode having a first surface; and
a second electrode having a second surface spaced apart from and facing the first surface, wherein the second surface comprises a conductive inner region and a substantially insulating peripheral region defining a boundary therebetween, wherein the boundary generates free electrons via a triple point emission effect when the spark gap is operated.

2. The spark gap of claim 1, wherein the first surface also comprises an additional conductive inner region and an additional substantially insulating peripheral region.

3. The spark gap of claim 1, wherein the first electrode comprises an anode and the second electrode comprises a cathode.

4. The spark gap of claim 1, wherein the conductive inner region comprises a conductive metal.

5. The spark gap of claim 1, wherein the substantially insulating peripheral region comprises one or more of a ceramic or an oxide.

6. The spark gap of claim 1, wherein the substantially insulating peripheral region has an annular geometry so as to define a circular boundary between the conductive inner region and the substantially insulating peripheral region.

7. The spark gap of claim 1, wherein the substantially insulating peripheral region has an irregular or jagged geometry so as to define an irregular boundary between the conductive inner region and the substantially insulating peripheral region.

8. The spark gap of claim 1, wherein the substantially insulating peripheral region comprises a plurality of separate insulating sub-regions forming a discontinuous pattern of insulating material.

9. The spark gap of claim 1, wherein the spark gap does not include a radioactive component.

10. An ignition device, comprising:
one or more igniters configured to ignite a fuel stream or vapor during operation; and one or more exciter components, each connected to a respective igniter, wherein each exciter component comprises a spark gap having a triple emission point that generates free electrons when the spark gap is operated, wherein the spark gap comprises:
a first electrode having a first surface; and
a second electrode having a second surface spaced apart from and facing the first surface, wherein the second surface comprises a conductive inner region and a substantially insulating peripheral region forming a boundary therebetween, wherein the triple emission point corresponds to the boundary formed between the conductive inner region and the substantially insulating peripheral region.

11. The ignition device of claim 10, wherein the first surface comprises an additional conductive inner region and an additional substantially insulating peripheral region.

12. The ignition device of claim 10, wherein the first electrode is an anode and the second electrode is a cathode.

13. The ignition device of claim 10, wherein the conductive inner region comprises a conductive metal and the substantially insulating peripheral region comprises a ceramic or oxide material.

14. The ignition device of claim 10, wherein the substantially insulating peripheral region is formed as a pattern or layer of conducting material on the second surface or as a separate insulating component fitted to the second electrode to form a peripheral region of the second surface.

15. A method for generating a conductive plasma, comprising:

applying a voltage across a spark gap comprising a first electrode and a second electrode, wherein the first electrode comprises a surface facing the second electrode that has a conductive inner region and a substantially insulating peripheral region forming a boundary therebetween;

generating free electrons at the boundary between the conductive inner region and the substantially insulating peripheral region via a triple point emission effect when the spark gap is operated; and subsequent to generating the free electrons, generating the conductive plasma across the spark gap.

16. The method of claim 15, further comprising igniting a fuel stream or vapor at a downstream igniter component in response to the conductive plasma bridging the spark gap.

17. The method of claim 15, wherein free electrons are not generated by a radioactive isotope.

* * * * *